US008744894B2

(12) United States Patent
Christiansen et al.

(10) Patent No.: US 8,744,894 B2
(45) Date of Patent: Jun. 3, 2014

(54) METHOD AND SYSTEM FOR ASSESSING, MANAGING, AND MONITORING INFORMATION TECHNOLOGY RISK

(75) Inventors: James Christiansen, Laguna Hills, CA (US); Rick D'Angona, Newport Beach, CA (US); Chris Bell, Mill Valley, CA (US)

(73) Assignee: Evantix GRC, LLC, Santa Ana, CA (US)

( * ) Notice: Subject to any disclaimer, the term of this patent is extended or adjusted under 35 U.S.C. 154(b) by 597 days.

(21) Appl. No.: 12/593,987

(22) PCT Filed: Apr. 30, 2008

(86) PCT No.: PCT/US2008/005519
§ 371 (c)(1),
(2), (4) Date: Sep. 30, 2009

(87) PCT Pub. No.: WO2008/140683
PCT Pub. Date: Nov. 20, 2008

(65) Prior Publication Data
US 2010/0114634 A1    May 6, 2010

Related U.S. Application Data

(60) Provisional application No. 60/915,001, filed on Apr. 30, 2007.

(51) Int. Cl.
*G06F 17/00* (2006.01)
(52) U.S. Cl.
USPC ....................................................... 705/7.28
(58) Field of Classification Search
USPC ....................................................... 705/7.28
See application file for complete search history.

(56) References Cited

U.S. PATENT DOCUMENTS

| 6,895,383 | B2 * | 5/2005 | Heinrich ...................... 705/7.28 |
| 7,813,944 | B1 * | 10/2010 | Luk et al. .......................... 705/4 |
| 8,307,427 | B1 * | 11/2012 | Wisilosky et al. .............. 726/22 |
| 2004/0230510 | A1 | 11/2004 | Tyson-Quah |
| 2005/0080720 | A1 * | 4/2005 | Betz et al. ....................... 705/38 |
| 2005/0096949 | A1 | 5/2005 | Aiber et al. |
| 2007/0156495 | A1 * | 7/2007 | King ................................. 705/8 |
| 2008/0103962 | A1 * | 5/2008 | Cohen et al. .................... 705/38 |

OTHER PUBLICATIONS

International Search Report and Written Opinion for International Application PCT/US2008/005519, completed Oct. 9, 2008, 9 pgs.

* cited by examiner

*Primary Examiner* — Thomas Dixon
(74) *Attorney, Agent, or Firm* — KPPB LLP (57) ABSTRACT

A method for information technology (IT) and information asset risk assessment of a business relationship between a client and a third party. The method includes establishing a database. The database includes a plurality of IT information risk factors. The database is configured to receive IT risk information. The IT risk information is associated with the plurality of IT information risk factors. The plurality of IT information risk factors includes a subset of relationship risk factors. The subset of relationship risk factors are utilized for evaluating the business relationship risk between the client and the third party. The method also includes receiving IT risk information corresponding to the subset of relationship risk factors. The method continues with generating a relationship risk score. The relationship risk score is determined in response to evaluating the subset of relationship risk factors using the IT risk information corresponding to the subset of relationship risk factors.

5 Claims, 5 Drawing Sheets

METHOD AND SYSTEM FOR ASSESSING, MANAGING, AND MONITORING INFORMATION TECHNOLOGY RISK

CROSS-REFERENCE TO RELATED APPLICATIONS

The present application claims priority to U.S. Provisional Application No. 60/915,001, filed Apr. 30, 2007.

STATEMENT RE: FEDERALLY SPONSORED RESEARCH/DEVELOPMENT

Not Applicable

BACKGROUND

Many businesses increase their dependency on outsourcers, third party technology products and services, electronic commerce, contractors, third party service providers and partners to gain a competitive advantage in the marketplace. This increase in reliance of the business with various third party entities or providers results in an increased risk to their information assets. The information assets at risk may include valuable electronic data such as intellectual property and customer data. These information assets are exchanged between the business and their third party entities and may be at risk of theft or tampering. The need to proactively manage this electronic or "eBusiness" risk associated with these relationships is being driven by State and Federal regulations, industry standards and customer pressures. Investors, regulators, and customers must have assurance that the businesses understand and manage the risk associated with housing and exchanging critical information assets.

Through business transformation, businesses have been migrating to outsourced services, leveraging third party products and services or relying on business partners to reduce costs. The migration away from in-house solutions to external solutions has intensified the need for stringent security controls on both sides of an information exchange. The requirement to actively manage information technology (IT) information risk is growing rapidly in scope and is extending beyond the business itself to include risks related to third party entities providing a service, product, or other solution to the business. Based on the steady growth of complex business relationships where digital information assets are exchanged between businesses, gaining visibility into risks associated with trusted third parties is becoming imperative. Business need a scalable method to assess the cost and efficiency associated with a particular action or plan to reduce or eliminate risk associated with their information assets as it pertains to a particular third party or a plurality of third parties. Furthermore, businesses require an acceptable and defendable method for quantifying the value of their information assets and the risk of exposing these assets in a particular business relationship or across all of their relationships based on either internal or current commercial solutions in the marketplace.

Increased public demand for businesses to take responsibility for protecting consumer data from unauthorized access has resulted in a corresponding increase in the number of regulatory requirements placed on them. Businesses are required to assess IT risk for their organization and their third party service providers to gauge the level of compliance to these regulations. These assessments must be conducted on a regular basis. There are well known methods in the art to assess IT risk. These methods include providing a risk report and an associated risk score. Each risk report focuses on the risk categories relative to a specific business or application being assessed without the benefit of placing the results in context. Individual IT risk assessments are expensive and time consuming. They are not standardized in a manner to allow comparative analysis or contextual alignment within particular business sectors. Businesses need a simple, sound method to use for deciding whether or not the IT risk posed by internal procedures or by its third party service providers is within its level of risk tolerance analogous to the way financial institutions rely on consumer credit scores to determine whether to fund loans or issue insurance policies.

This, combined with the multitude of regulations and requirements, is placing an increased burden on businesses and their many third party providers regarding risk assessment, auditing and compliance management. It is apparent that both businesses and their third party providers will incur greater costs as a result of this increased scrutiny on IT security controls. Considering that each business may have many third party relationships, the assessment process adds additional requirements for manpower and financial resources to track, collect and verify the outsourced third party's IT security. These businesses are limited in their ability to effectively monitor and manage new and existing relationships. Additionally, businesses may have a limited understanding of regulatory and/or contractual obligations governing information assets. There are a variety of well known methods for assessing eBusiness risk in the art. However, current methods of assessing eBusiness risk associated with a risk score are vague, non-actionable and do not accurately quantify the IT information risk of a business relationship. Current methods do not appear to offer visibility or alternatively, offer a very limited view into the risks associated with these business relationships, thereby providing ineffective or incomplete solutions for managing the risk exposure. Businesses do not have a scalable, cost efficient, and secure method for meeting the compliance requirements associated with contracts and regulations governing their management of information assets risk. Additionally, IT auditors do not have a quantifiable method for reporting results associated with the audit of controls surrounding information assets. Further, the methods known for assessing eBusiness risk do not appear to provide insurance companies a method for quantifying information asset risk for purposes of underwriting.

Thus, there is a need in the art for an improved method and system for assessing risk exposure for a business exchanging information assets with a plurality of third parties associated with the business.

BRIEF SUMMARY

The present invention specifically addresses and alleviates the above-identified deficiencies in the art. In this regard, the present invention is directed to a method for information technology (IT) and information asset risk assessment of a business relationship between a client and a third party. The method includes establishing a database. The database includes a plurality of IT information risk factors. The plurality of IT information risk factors stored in the database are associated with certain risks the client may be exposed to based on an action the client follows or based upon who the client uses as their third party provider. The database is configured to receive IT risk information. The IT risk information is associated with the plurality of IT information risk factors. The database is also configured to receive updated IT risk information for storage thereon. The plurality of IT information risk factors includes a subset of relationship risk factors. The subset of relationship risk factors are utilized for evaluating the business relationship risk between the client and the third party. The method also includes receiving IT risk information corresponding to the subset of relationship risk factors. The method continues with generating a relationship risk score. The relationship risk score is determined in response to evaluating the subset of relationship risk factors using the IT risk information corresponding to the subset of relationship risk factors. The method includes monitoring the database for updated IT risk information. The updated IT risk information is used to evaluate the subset of relationship factors and generate a revised relationship risk score. It is contemplated that the database is a server configured to receive the IT risk information from the client or the third party via a computer network.

Another embodiment in accordance with the present invention includes compiling IT risk information on the database. The compiled IT risk information corresponds to a subset of business profile risk factors. The subset of business profile risk factors are from the plurality of IT information risk factors. The subset of business profile risk factors are used to evaluate the business profile risk of the third party. It is contemplated that the IT risk information corresponding to the subset of business profile risk factors is compiled from public records. The IT risk information compiled from the public records is associated with the third party. The method may continue by generating a business profile risk score. The business profile risk score is generated in response to the evaluation of the subset of business profile risk factors. The database may be monitored for updated IT risk information corresponding to the subset of business profile risk factors. The updated IT risk information is used to revise the business profile risk score.

In yet another embodiment of the present invention, the plurality of IT information risk factors stored on the database includes a subset of IT control risk factors. The database is configured to receive IT risk information corresponding to the subset of IT control risk factors. The subset of IT control risk factors are evaluated using the received IT risk information associated with the third party. The method continues with generating an IT controls risk score. The IT controls risk score is generated in response to the evaluation of the subset of IT control risk factors. The method also includes monitoring the database for updated IT risk information corresponding to the subset of IT control risk factors. This is accomplished for revising and updating the IT controls risk score.

In one embodiment of the present invention, an IT risk score is generated. The IT risk score is a combination of the relationship risk score, the business profile risk score, and the IT controls risk score.

To further standardize the relationship risk score, the relationship risk score may be associated with the type of service provided by the third party to the client. The IT controls score may also be associated with the type of service offered or provided to the client by the third party.

In one embodiment of the present invention, a client relationship risk tolerance level is evaluated. The client relationship risk tolerance level is determined using a plurality of client relationship risk tolerance criteria. Answers to the plurality of client relationship risk tolerance criteria may be provided by the client for determining the client relationship risk tolerance level. After determining the client relationship risk tolerance level, a plurality of relationship risk mitigation actions are provided that are dependent upon the client relationship risk tolerance level. The appropriate relationship risk mitigation action plan may be selected based upon the relationship risk score. The method may also include evaluating a client business profile risk tolerance level. Similar to the client relationship risk tolerance level, the client business profile risk tolerance level is based upon answers provided by the client with respect to a plurality of client business profile risk tolerance criteria. The client business profile risk tolerance level may correspond to a plurality of business profile risk mitigation actions. The method also includes identifying an appropriate business profile risk mitigation action depending upon the business profile risk score. A client IT controls risk tolerance level may also be evaluated based upon information responsive to a plurality of client IT controls risk tolerance criteria. The IT controls risk tolerance level may correspond to a plurality of IT controls risk mitigation actions. The IT controls risk mitigation action preferred may be identified based upon the IT controls risk score.

An aspect of the present invention contemplates IT risk information transmitted to the database from the client. IT risk information may also be transmitted to the database from the third party. Additionally, the database may include a web based application. The web based application may be configured to automatically search and compile IT risk information available in public records. The method may also include receiving IT risk information from an auditor. The IT risk information from the auditor corresponds to the subset of IT control risk factors. The IT risk information from the auditor may be utilized to validate the IT risk information associated with the third party or IT control risk factors submitted by the third party. A revised IT controls risk score may be generated using the validated IT risk information thereby providing more accuracy. In one embodiment, a plurality of business relationships between the client and a plurality of third parties may be assessed. This provides the client with a method of evaluating a plurality of third parties in a timely and cost efficient manner.

The present invention also provides a method for assessing compliance associated with a contract between a client and a third party. The method also assesses compliance between the client and the third party with respect to a government regulation, a law, or an industry standard. The method includes establishing a database. The database is utilized for storing a plurality of obligations for the third party associated with the contract, the government regulation, the law, or the industry standard. The database is also configured to receive information corresponding to the plurality of obligations. The plurality of obligations may be evaluated based upon the received information. The method continues with generating a compliance score. The compliance score is representative of the fulfillment of the plurality of obligations corresponding to the third party. It is also contemplated that the database is continuously monitored for information corresponding to the plurality of obligations. This allows for updating the compliance score when requested. Information corresponding to the plurality of obligations may be provided by the client, the third party, or compiled from public records by the database. The method may also include receiving verified information from an auditor corresponding to the plurality of obligations. The verified information from the auditor is compared with the information corresponding to the plurality of obligations. Any discrepancy may be updated to reflect the verified information. A revised compliance score is generated to reflect the verified information.

The present invention also provides a risk assessment system accessible to a plurality of clients and plurality of third parties. The system is utilized to assess, manage, and monitor risk between at least one client and at least one third party associated with the client. The system includes a database having a plurality of IT information risk factors. The database is configured to continuously receive IT risk information for evaluating the plurality of IT information risk factors. The system also includes a scoring application in communication with the database. The scoring application utilizes the plurality of IT information risk factors to generate a plurality of risk scores. The system includes an auditing application configured to receive validated IT risk information from an auditor. The validated IT risk information corresponds to the plurality of IT information risk factors. It is contemplated that the auditing application is in communication with the scoring application for adjusting the plurality of risk scores in response to receiving the validated IT risk information from the auditor. The system may also include a risk manager application. The risk manager application is accessible to the client and configured to receive IT risk information from the client. The IT risk information from the client is used to simulate an adjustment to the plurality of risk scores. It is contemplated that every application or component such as the risk manager, compliance manger, audit manager may be implemented as a stand alone software component configured to communicate with the system. In this regard, any single application or component may be licensed separate from the system.

A method is also provided for risk assessment between a client and a third party. The method includes establishing a database having a plurality of IT information risk factors. The database is configured to receive IT risk information associated with the plurality of IT information risk factors. The IT risk information is evaluated for determining the risk between the client and the third party. A risk score is generated representative of the risk assessment between the client and the third party. The method also includes validating IT risk information associated with a subset of IT information risk factors from the plurality of IT information risk factors. The method may conclude with revising the risk score to reflect the validated IT risk information.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of analyzing information technology (IT) and information assets associated with a business relationship between a client and a third party. Further, the various features of the embodiments disclosed herein can be used alone, or in varying combinations with each other and are not intended to be limited to the specific combination described herein. Thus, the scope of the claims is not to be limited by the illustrated embodiments. It is further understood that the use of relational terms such as clients and third party, and the like are used to distinguish one from another entity without necessarily requiring or implying any actual such relationship or order between such entities.

Figure 1:
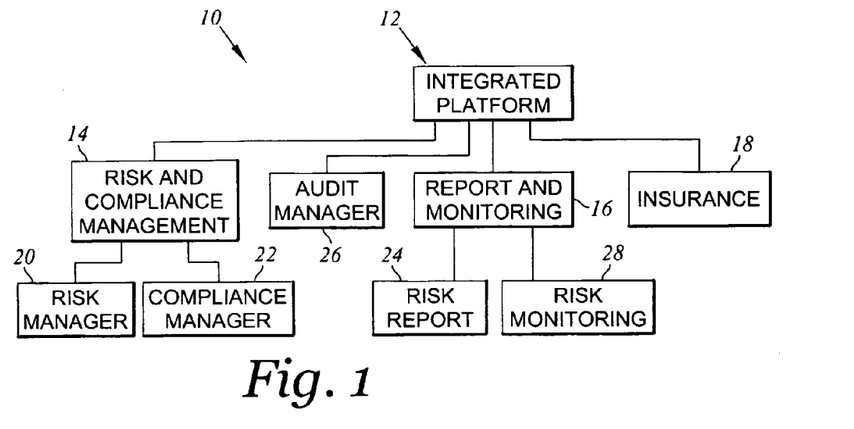
FIG. 1 is a block diagram depicting the information technology and information risk assessment system constructed in accordance with the present invention.

With reference to FIG. 1, a diagram illustrating the various components of the method and system for assessing information technology (IT) and information assets 10 is provided. An integrated platform 12 for assessing IT and information asset risk associated with the business relationship between the client and the third party. In this regard, the term "client" is understood to refer to the role of a business or enterprise as a requestor of data or services, while the term "third party" is understood to refer to the role of the entity providing such data or services. Additionally, it is possible that the clients may request data or services in one transaction and provide data or services in another transaction, thus changing its role from client to third party or vice versa. It is contemplated that the third party may include entities such as service providers, outsourcers, insurers, auditors by way of example and not of limitation.

An aspect of the present invention contemplates the integrated platform 12 as a software as a service (SaaS) application. The SaaS application may be hosted on a server or licensed to a client or third party. The integrated platform 12 provides the client and the third party a context from which to determine how IT and information assets relate to industry risk tolerance levels using a standardized IT information risk score. The client and the third party may utilize the standardized IT information risk score to determine whether to accept an identified IT information risk without implementing security controls, implementing security controls to mitigate potential risk or transferring the risk to an insurer willing to indemnify the client or the third party from damages resulting from the identified IT information risk.

The integrated platform 12 may provide real-time analysis and continuous risk activity monitoring to either properly accept, mitigate or transfer risk associated with the business relationship between the client and the third party. The integrated platform 12 may be accessible via a secure web portal or gateway. In this respect, the client may access the integrated platform 12 via a web browser. The level of access may depend on the client's subscription to the various components by securely logging into the integrated platform 12 using a registered username and password. The integrated platform 12 may be divided into a multitude of separate internal applications including a risk and compliance management application 14, a report and monitoring application 16, an audit manager application 26 and an insurance application 18. Also included within the integrated platform 12 is a management services application (not shown). Additionally, the integrated platform 12 includes a database (not shown) used to store information obtained from the third party, the client, information generated by the applications, and information obtained from public records. The various applications of the integrated platform 12 are configured to be in communication with the database and each other. Furthermore, it is contemplated that the database is configured to store information for a plurality of business relationships between a plurality of clients and a plurality of third parties. It is contemplated that each application or component hosted on the integrated platform 12 may be implemented as a stand alone software component independent of the integrated platform 12.

The risk and compliance management application 14 may include a risk manager component 20 and a compliance manager component 22. The risk manger component 20 is utilized by the client as an interface for monitoring the client's business relationship with third parties and providing a proactive tool for the client to mitigate IT information risk related to the plurality of third parties. The compliance manager component 22 is a tool for use by the client to organize and assess whether various compliance requirements are being followed and/or implemented with respect to industry, regulatory, and contractual obligations.

The report and monitoring application 16 includes a risk report component 24, an audit manager component 26, and a risk monitoring component 28. The internal applications and components are supported and fully integrated with various services. It is contemplated that the integrated platform 12 may function in an auto-policy mode that automates proactive actions for third parties classified as medium to high IT information risks based upon the standardized IT information risk score. The integrated platform 12 is designed to be a self-servicing platform for multiple stakeholders including clients, third parties, auditors, insurers, and others by way of example only and not of limitation. The integrated platform 12 brings multiple groups such as information security, IT, auditors, third parties, insurance agents, risk managers and compliance managers together to a common risk management and assessment platform. The integrated platform 12 allows each identified stakeholder secure access to complete or manage risk assessments, register third parties, run multiple risks and compliance reports or perform third party standardized IT information risk score lookups. The integrated platform 12 may be hosted on a web server or it may be licensed and processed at the client. The integrated platform 12 is contemplated to provide secure exchange of risk and compliance information among these various groups. This may be accomplished through the use of digital rights management (DRM) tools to secure information on the database.

The audit manager component 26 includes the functionality to schedule an audit, develop an audit plan, review IT security control responses from the third party, and review evidence of control compliance as provided by the third party using a secure web based interface. The system contemplates the ability to manage multiple audits of different types simultaneously.

The management services application may provide a workflow system to allow third parties and clients to distribute the workload of the system to different staff members within their organization automatically. The management services application is in communication with the database to provide a secured data storage service to allow the client or third party to define access rights to the information stored on the database. The management services application further provides automated risk management policy enforcement whereby the client can define the risk tolerance levels and the policy enforcement application will automatically enforce those policies throughout the system.

Figure 2A:
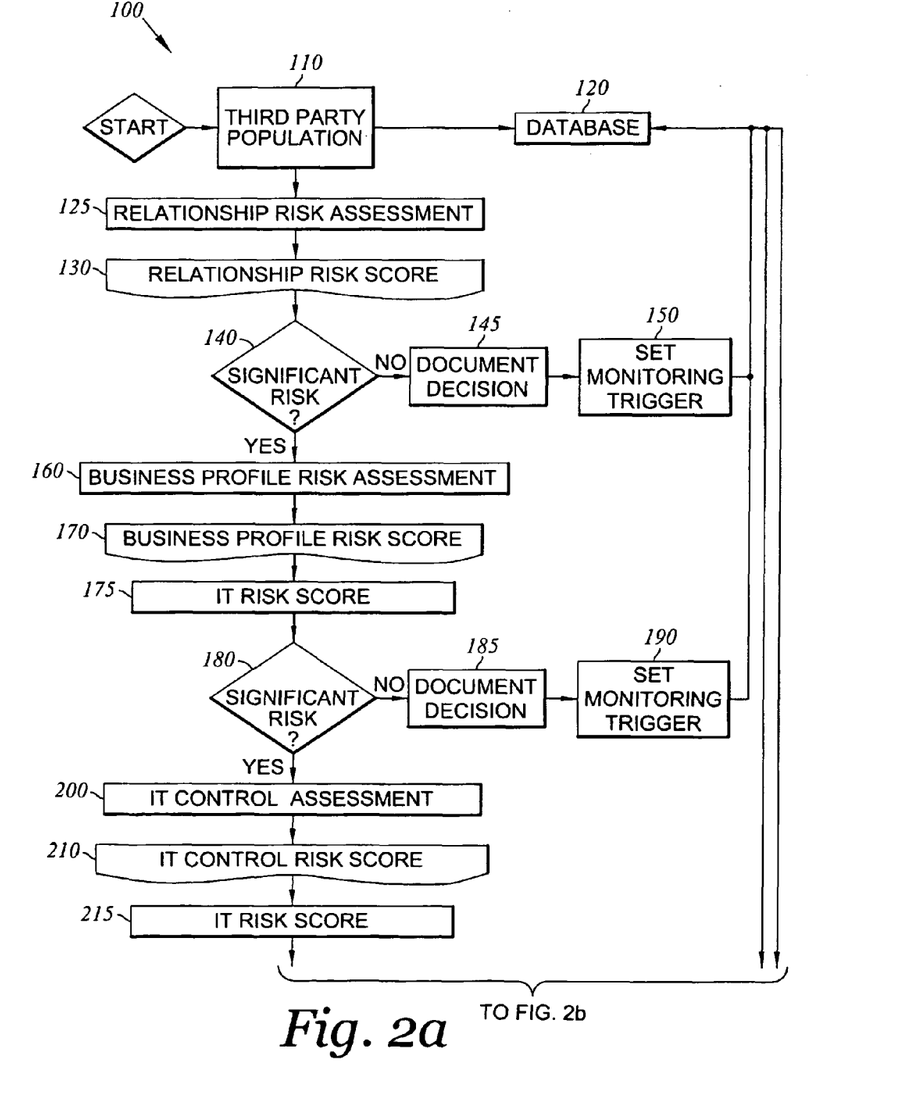
FIG. 2 is a flow chart representative of a risk report component for risk assessment.

Referring now to FIG. 2a, a flow chart illustrates a method for generating the standardized IT information risk score in accordance with an embodiment of the present invention. The risk report component 24 may utilize a multi-tiered IT information risk assessment to develop the standardized IT information risk score. To initiate the review process 100, the client may access the integrated platform 12 and utilize a look-up feature to locate the third party the client would like to review. The client then selects the third party from the plurality of third parties registered with the database 120. The plurality of third parties registered with the database 120 may be referred to as the third party population 110. Clients relying on the third parties to provide the client with products, data or services may review these third parties to determine the level of IT risk present within their operating environments. The integrated platform 12 interfaces with the client's risk manager component 20 to load a list of third parties to create a third party pick list from the third party population 110 to streamline the process for initiating IT information risk reviews. If the third party is not found on the pick list, then the client may enter the name, address, tax-id number and other identifying information of the third party the client would like to review into the database 120 via the risk manager component 20. A web application hosted on the integrated platform 12 builds a key using this information to retrieve available public data associated with the third party. The available public data is stored in the database 120 for use in generating a business profile risk score 170.

The database 120 includes a plurality of IT information risk factors related to the business relationship between the client and the third party, the available public data associated with the third party, and IT security controls implemented by the third party. The plurality of IT information risk factors is evaluated by the risk report component 24 to generate the standardized IT information risk score. The plurality of IT information risk factors are normalized, weighed, and integrated into the multi-tiered scoring model that produces the standardized IT information risk score representative of IT information risk and information security exposure associated with the business relationship between the client and the third party. A relationship risk assessment 125 is executed for the business relationship between the client and the third party. The relationship risk assessment 120 measures the inherent risk the client has on the third party by factoring information specific to the relationship like the type of service offered and/or sensitivity of the information being exchanged. IT risk information is received by the database 120 corresponding to the relationship risk assessment 125. The IT risk information may be provided in the form of responses by the client to questions selected from a subset of relationship risk factors from the plurality of IT information risk factors. In other words, the client may answer a set of questions focused on the relationship with the third party being reviewed. The questions and answers aim to quantify the significant aspects of the relationship so that the risk posed by particular IT vulnerabilities can be put into context. If the third party being reviewed is not a major provider of services to the client reviewing it, then perhaps the impact of a high vulnerability of IT information risk is reduced.

The subset of relationship risk factors associated with the relationship risk assessment 125 by way of example, may include: nature of the relationship (monetary value, length of relationship, location), contract terms, privacy (content sensitivity, regulated data), business processes, intellectual property competitiveness, fraud, reporting and compliance, relationship insurance coverage. The client provides IT risk information for evaluation of each relationship risk factor from the subset of relationship risk factors by answering the set of questions as indicated above. The questions may request the client to select the primary type of relationship that exists with the third party (i.e. application development, system monitoring, hosting services, or data processing), how long the relationship has existed as it relates to the scope of service, and monetary value of the relationship. These questions are by way of example only and not meant to limit the type and quantity of questions related to the subset of relationship risk factors associated with the relationship risk assessment 125. The client response to each relationship risk factor from the subset of relationship risk factors is scored and weighted. A scoring algorithm is utilized to generate a relationship risk score 130. The relationship risk score 130 is stored in the database 120. The relationship risk score 130 is representative of the IT and information risk exposure associated with the business relationship between the client and the third party. In one embodiment, the relationship risk score=f(revenue reliance, process maturity, industry sector*impact to business of relationship factor)*relationship factor weighting. Results are then normalized by category using standard mathematical normalization processes.

Figure 4:
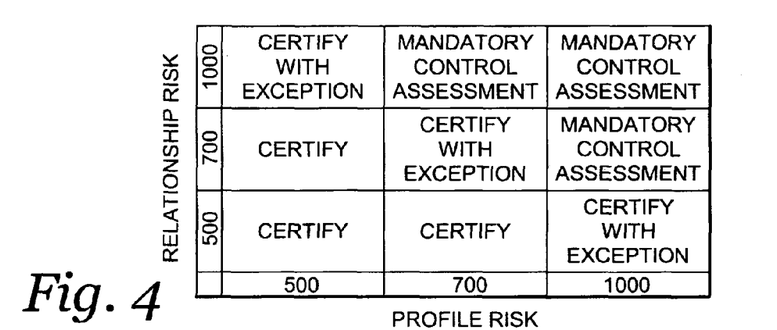
FIG. 4 is a chart illustrating possible action plans based on scores generated by the risk report component.

The next step may include determining if the relationship risk score 130 poses a significant risk 140 to the client. The significant risk 140 assessment may be implemented by the risk manager component 20. The client may access the risk manager component 20 wherein a questionnaire to be answered by the client is provided. The questionnaire corresponds to a plurality of relationship risk tolerance criteria. Based upon the answers provided by the client, a client relationship risk tolerance level may be evaluated. Referring now to FIG. 4, a chart representative of relationship risk mitigation actions is provided. The risk manager component 20 may include the chart for each client relationship with the plurality of third parties. A relationship risk mitigation action may be identified based upon the relationship risk score 130. For example, if the relationship risk score 130 ranges between 500 and 700, the relationship risk mitigation action may advise certifying the business relationship between the client and the third party. Alternatively, if the relationship risk score 130 is greater than 700, the client risk tolerance level may suggest certifying the third party with an exception. The exception allows the client to specify a period of time or other factor used to approve the business relationship with the third party although the relationship risk score 130 of the business relationship may be outside the scope of the client's risk tolerance level. Referring again to FIG. 2A, if the business relationship does not pose a significant risk with regard to the client risk tolerance level, the decision to certify is documented 145 on the database 120. Further, based on the client risk tolerance level, a trigger 150 may be provided wherein if the relationship risk score 130 exceeds the trigger 150 further assessment is required. This added function may be implemented through the risk monitoring component 28. If the relationship risk score 130 between the client and the third party poses a significant risk 140 further evaluation may be required.

The risk report component 24 may continue by providing an automated way to assess the third party using IT risk information gathered from public records. Further assessment continues with a business profile risk assessment 160. The business profile risk assessment 160 measures the IT information risk associated with doing business with the third party to meet its business objectives. The plurality of IT information risk factors stored in the database 120 may include a subset of business profile risk factors associated primarily with the business profile risk assessment 160. It is contemplated that the IT risk information used to evaluate the subset of business profile risk factors is collected from public records. The public records include information regarding prior security breaches, financial history, credit history, and legal history. It is contemplated that a web based application hosted on the integrated platform 12 is configured to automatically collect IT risk information associated with the subset of business profile risk factors and store the information within the database 120.

Similar to the relationship risk score 130, the scoring algorithm is used to generate a business profile risk score 170. Key areas of measurement contemplated to be encompassed by the subset of business profile risk factors include: geopolitics, locale, regulatory oversight, financial strength. The key areas of measurement listed above are by way of example only and not of limitation. The IT risk information collected is used to evaluate each business profile risk factor from the subset of business profile risk factors. Each business profile risk factor is scored and weighted to generate the business profile risk score 170. The business profile risk score 170 is stored in the database 120. The goal is to measure the IT information risk associated with doing business with the third party as indicated by the subset of business profile risk factors, e.g. history of a security breach, or is in financial stress and may not be able to maintain the controls required by the client. The subset of business profile risk factors listed above are by way of example only and not of limitation. Third parties receiving high or medium business profile risk scores 170 would be reviewed in depth using the risk scoring system of the risk reporting component 24. In one embodiment of the present invention, the business profile risk score=f(industry, regulatory controls, financial health*potential of material business impact)*Profile Factor Weighting. Results are then normalized by category using standard mathematical normalization processes.

Following the generation of the business profile risk score 170, an IT risk score 175 is calculated. The IT risk score 175 is a function of both the relationship risk score 130 and the business profile risk score 170. Similar to the significant risk 140 assessment for the relationship risk score 130 by the risk manager component 20, the same may be accomplished in the context of the IT risk score 175. Referring again to FIG. 4, the chart may include risk mitigation actions relating to the business profile risk score 170 individually or in combination with the relationship risk score 130. For example, if the business profile risk score 170 exceeds 700, the risk mitigation plan may suggest a mandatory control assessment or the risk manager component 20 may be configured to automatically begin the process depending the client's settings. Referring again to FIG. 2A, if the IT risk score 175 does not pose a significant risk 180 with regard to the client risk tolerance level, the decision to certify is documented 185 on the database 120. Further, based on the client risk tolerance level, a trigger 190 may be provided to alert the client when the IT risk score 175 exceeds the trigger 190. The client may then determine through the risk manager 20 component whether further assessment is required. The monitoring function may be implemented through the risk monitoring component 28.

The risk report component 24 may continue by utilizing responses to a series of IT control measurements covering ISO27001/2 key controls for example. The risk report component 24 further contemplates conducting an IT security control assessment 200. The IT security control assessment 200 measures the amount of IT information risk associated with the third party based on the assessment of IT security controls within the third party environment. The plurality of IT information risk factors stored on the database 120 further include a subset of IT security control factors associated with the IT security control assessment 200. Some key areas of measurement by way of example include: insurance coverage, industry compliance, legal compliance, regulatory compliance, risk management, IT environment, outsourcing, security policy, information security organization, third party management, asset management, information assets, human resources security, physical and environmental security, communications and operations management, system logs, laptops/desktops, mobile devices, information backup, network, removable media, electronic messaging, web applications, access control, password management, secure login and remote access, information systems acquisition, testing security controls, information security incident management, business continuity management, and compliance. The key areas of measurement listed above are by way of example only and not of limitation.

In one embodiment, automation is accomplished by using a web based technology to gather information on the maturity of the third party IT security controls. By using a series of IT security control factors the maturities of the third party's IT security controls are assessed to determine if the IT security controls implemented by the third party are adequate to meet the needs of the client. The more mature the controls implemented by the third party, the less IT information risk exposure vulnerability for the client. The scoring process provides decision criteria and accountability for the client. The more reliant the client is on the third party the higher risk a lack of IT security controls places on the client. An aspect of the present invention contemplates an IT control risk score $210=f$ ((implemented IT security controls, reliability controls implemented, scalability controls implemented, detection controls implemented, recovery controls implemented*probability of breakdown in this control leading to a security breach)*impact to the business of a breach from this control). Results are then normalized by category using standard mathematical normalization processes.

The IT security control assessment 200 focuses on the IT environment of the third party being reviewed. The third party is sent password protected logon information and the third party representative logs on to complete the IT security control assessment 200. Multiple questions may be presented based on the ISO027001/2 controls structure, or other similar controls standard, and must be answered before the IT security control assessment 200 is marked complete. Answers to the questions are multiple choices or rely on a selection list to maintain consistency and objectivity. Weights are assigned to each answer and calculations combine answers into specific information security domains to generate individual third party IT control risk scores 210. The generated IT control risk score 210 is stored in the database 120. An alert is sent to the client notifying the client that the IT control risk score 210 is available for review and includes the IT control risk score code number that is associated with the third party that was reviewed. The client logs onto the web application using the IT control risk score code and accesses the IT control risk score 210.

An aspect of the present invention contemplates using a self-reporting electronic IT security control assessment survey to measure the maturity of the IT controls in place within the third party being reviewed. It is contemplated that the third party provides information for evaluation of the subset of IT security control factors. For example, the third party may be presented with a questionnaire including various questions and answers corresponding to the subset of IT security control factors. Additional data that could indicate the company's ability to manage its IT information risk is gathered from public records. The survey may include measurement in all areas of the ISO027001/2 control standards. For example, a survey question may inquire: What percentage of the third party's laptops are protected by encryption? (A. 0%-25%, B. 26%-50%, C. 51%-75%, D. 75%-95%, E. >96%). The third party's response to each IT security control risk factor from the subset of IT security control risk factors is scored and weighted. A scoring algorithm is utilized to generate an IT security control score 210. The IT security control score 210 is then stored in the database 120. It is also contemplated that the third party may provide evidence electronically through the database 120 to validate or prove that the third party is in compliance with the IT security control risk factors.

Figure 2B:
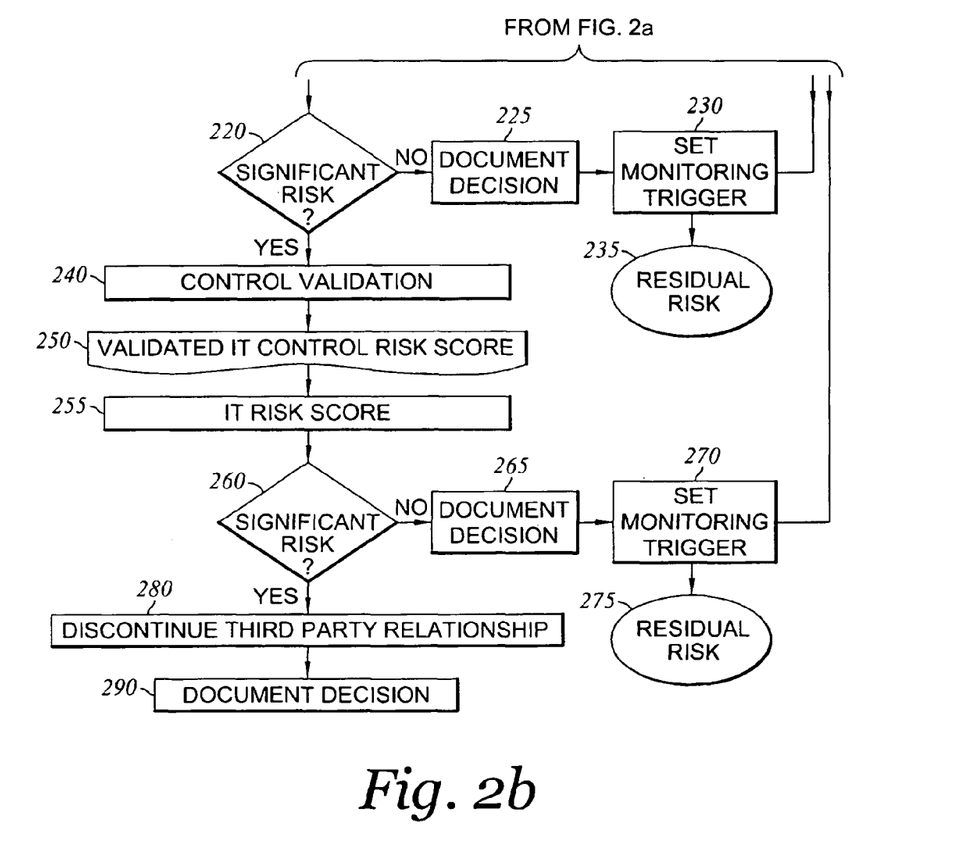

Following the IT control risk score 210, a new IT risk score 215 is calculated. The new IT risk score 215 incorporates the relationship risk score 130, the business profile risk score 170, and the IT control risk score 210. Referring now to FIG. 2b, the IT risk score 215 is assessed to determine whether there is a significant risk 220 to the client based upon client risk tolerance levels. If the IT risk score 215 does not pose a significant risk 220 with regard to the client risk tolerance level, the decision to certify is documented 225 on the database 120. Further, based on the client risk tolerance level, a trigger 230 may be provided for alerting the client when the IT risk score 215 exceeds the trigger 230 and thus suggesting further assessment. This monitoring function may be implemented through the risk monitoring component 28. Additionally, it is contemplated that unmanaged risk regardless of the actions of the client and the third party may be quantified. The unmanaged risk may be quantified as residual risk 235. The residual risk 235 may be mitigated through the insurance application 18 as described in further detail below.

If a further assessment is required after generating the IT risk score 215, the next step may include control validation 240. The control validation 240 step utilizes the audit manager component 26. The IT risk information used to evaluate the IT security control assessment 200 is audited to determine the accuracy of the information. An auditor may conduct an independent audit using the subset of IT security control risk factors. The auditor may access the integrated platform 12 and provide the audited IT risk information via the audit manager component 26. Therefore, the control validation 240 step modifies the IT control risk score 210 into a validated IT control risk score 250. The validated IT control risk score 250 is similar to the IT control risk score 210, however, the validated IT control risk score 250 utilizes the audited IT risk information.

IT risk score 255 is calculated incorporating the relationship risks score 130, the business profile risk score 170, and the validated IT information risk score 250. The IT risk score 255 is stored in the database 120. The IT risk score 255 is used as a reliable and objective tool by clients to determine the overall relative IT and information risk associated with the third party. The IT risk score 255 provides analysis for managing the client's third party relationships including accepting identified risk, implementing controls to mitigate the risk, or transferring risk to a third party insurer via insurance.

The IT risk score 255 may also be assessed to determine whether there is a significant risk 260 to the client based upon client risk tolerance levels associated with the plurality of IT information risk factors. If the IT risk score 255 does not pose a significant risk 260 with regard to the client risk tolerance level, the decision to certify is documented 265 on the database 120. Further, based on the client risk tolerance level, a trigger 270 may be provided to alert the client if the IT information risk score 255 exceeds the trigger 270. If the IT risk score 255 exceeds the trigger 270, the client may discontinue the business relationship with the third party, not initiate a relationship with the third party, or mitigate the risks. It is also contemplated that automated actions may be taken on behalf of the client by at least one component of the integrated platform 12. The unmanaged risk in relation to the IT risk score 255 may be quantified as residual risk 275. If the IT risk score 255 is significant with respect to the client tolerance levels, the third party relationship may be discontinued 280. The decision is documented 290 on the database 120.

The IT risk score 255 may also be linked to the type of service being provided to the client for evaluating IT and information risk. A standard set of service types are used to determine inherent security risk. The present invention provides a method to associate the service type corresponding to the relationship risk with the IT risk score 255. This process also then allows a standard risk definition for third parties by service type. This service type risk is continually refined as completed third party risk assessments are categorized by service type. For example, service types may include IT service providers, technology product providers, IT outsourcing service providers, consulting/advisory service providers, providers that provide advisory services in enterprise risk management, business process innovation, business planning and internal audit services, IT staffing service providers, healthcare, manufacturing, marketing/publishing, retail, education/training providers.

The risk report component 24 allows for analysis of the third party using multi-layer assessment criteria. The multi-layer assessments may be based on industry standards including for example: FISAP, CoBit, ISO27001/2, and PCI. Further, the risk report component 24 may be configured to generate a plurality of different risk scores based on attributes of the business relationship between the client and the third party. For example, an intellectual property risk score, regulated data risk score, country risk score, and application development risk score may be generated based on the attributes of the relationship between the client and the third party.

In accordance with an embodiment of the present invention, the scoring algorithm utilized by the risk report component 24 to generate the relationship risk score 130, the business profile risk score 170, the IT control risk score 210, and the IT risk score 255 is better understood by reviewing the glossary and accompanying equations as follows:

Glossary

Rsk—Risk factors;
Cat—Category scores used to demonstrate risk in broader areas of risk factors;
Kc—Key control risk scores used to demonstrate risk in a wide area of risk factors;
Ov—The overall score used to demonstrate risk represented by the entire area of risk factors;
RskRS—Risk factor raw score;
RskMS—Risk factor max score;
RskNS—Risk factor normalized score;
RskW—Risk factor weight used to determine the probability that a failure of a given risk factor will result in a security breach;
RskWMS—Risk factor weighted max score (RskMS*RskW);
CatRF—Category risk factor is the scope of risk factors within a given category; and
KcRF—Key control risk factor is the scope of risk factors within a given category.

The calculation for category score and key control score differ in scope. A risk factor can exist at key control or category level and will be considered together with its respective key control or category siblings. The input will have the risk factor raw score, risk factor weight, and category weight. The rest of the fields are derived values.

1. Risk Factor Score—The weighted RskWS is derived by multiplying the answer raw score that represents the maturity of the control by a weighting factor that represents the probability that a failure in this control would result in an IT security breach. The RskWS is then divided by the max score, and then multiplied by 1000 to obtain a risk factor normalized score (RskNS). The following formula represents the calculation of the RskNS:

RskRS=Selected Answer Score

RskWS=RskRS*RskW

RskMS=MAX of the possible answer scores

RskNS=((RskWS/(RskMS*RskW))*1000

2. Selected Answer with Child Risk Factors—Many risk factors need further definition to clarify a response to a high level risk factor with more in-depth review. For instance a positive response to the risk factor "Do you have information security policies?" results in additional risk factors being measured, e.g. "Do you have a physical security policy?" and "Do you have an intrusion detection policy?" These are referenced as child or sibling risk factors. The child set risk factor score is derived by first calculating the weighted risk factor score (RskWS) of each child risk factor. The RskWS is derived by multiplying the answer raw score (RskRS) by the risk factor weight (RskW). The RskWS are summed for the entire dependent child risk factors and divided by sum of the entire child risk factor weights (RskW). The following formula represents the calculation of the child set risk factor score: The definite integral between i and n (n=number of factors), where i=0 for (RskRSchild ix RskWchild i) divided by the definite integral between i and n, where i=0 for (RskWchild i). For a selected answer with associated child risk factors, the score assigned to the answer itself is ignored and replaced by the child set risk factor score.

3. Category Score—The category risk score is derived by calculating the CatWS. To calculate the CatWS, first calculate the RskWS for each risk factor within the category by multiplying each RskRS by the RskW. Then calculate the CatW by summing the RskW for each of the risk factors in the category. The category raw score is calculated by dividing the CatWS by the CatW. The following formulas represent the calculation of the Category risk score:

CatWS equals the definite integral between $i$ and $n$, where $i=0$ for (RskRSCatRFi×RskWCatRFi)

CatW equals the definite integral between $i$ and $n$, where $i=0$ for (RskWCatRFi)

CatRS=(CatWS)/(CatW)

The category max score is derived by first calculating the category weighted max score (CatWMS). To calculate CatWMS firs sum the results of the RskMS*RskW for each of the risk factors within the category. Then divide the CatWMS by CatW (described above). This is represented by the following formula:

CatWMS equals the definite integral between $i$ and $n$, where $i=0$ for (RskMSCatRFi×RskWCatRFi)

CatMS=(CatWMS)/(CatW)

The category normalized score is derived by dividing the CatWS by the CatWMS. The result is multiplied by 1000. This is represented by the following formula:

CatNS=(CatWS/CatWMS)*1000.

4. Key Control Risk Score—The key control risk score is derived by first calculating the key control weighted score (KcWS). To calculate the KcWS first calculate the CatWS for each category within the key control by multiplying each CatRS by the CatW. Then calculate the KcW by summing the CatW for each of the categories in the key control. The key control raw score is calculated by dividing the key control weighted score (KcWS) by the KcW. The following formulas represent the calculation of the key control risk score:

KcWS equals the definite integral between $i$ and $n$, where $i=0$ for (CatRSKcRFi×CatWKcRFi)

KcW equals the definite integral between $i$ and $n$, where $i=0$ for (CatWKcRFi)

KcRS=KcWS/KcW

The key control max score is derived by first calculating the key control weighted max score (KcWMS). To calculate KcWMS the first sum the results of the category max score (CatMS) times the CatW for each of the categories within the key control. Then divide the KcWMS by KcW. This is represented by the following formulas:

KcWMS equals the definite integral between $i$ and $n$, where $i=0$ for (CatMSKcRFi×CatWKcRFi)

KcMS=KcWMS/KcWMS

The key control normalized score is derived by dividing the key control weighted score (KcWS) by the key control weighted max score (KcWMS). The result is multiplied by 1000. This is represented by the following formula:

KcNS=(KcWS/KcWMS)*1000.

5. Overall Score—The overall score is used by the risk report component 24 to demonstrate risk represented by the entire area of the plurality of IT information risk factors. The overall risk score is derived by first calculating the overall weighted score (KcWS). To calculate the OvWS first calculate the KcW. The following formulas represent the calculation of the overall weighted score:

OvWS equals the definite integral between $i$ and $n$, where $i=0$ for (KcRSOvRFi×KcWOvRFi)

The overall set max score is derived by first calculating the overall set weighted max score (OvWMS). To calculate OvWMS first sum the results of the key control max score (KcMS) times the key control weight (KcW) for each of the key controls within the overall set. Then divide the OvWMS by OvW. This is represented by the following formula:

OvWMS equals the definite integral between $i$ and $n$, where $i=0$ for (KcMSOvRFi×KcWOvRFi)

The overall set normalized score is derived by dividing the overall set weighted score (OvWS) by the overall set weighted max score (OvWMS). The result is multiplied by 1000. This is represented by the following formula: OvNS= (OvWS/OvWMS)*1000.

Figure 3:
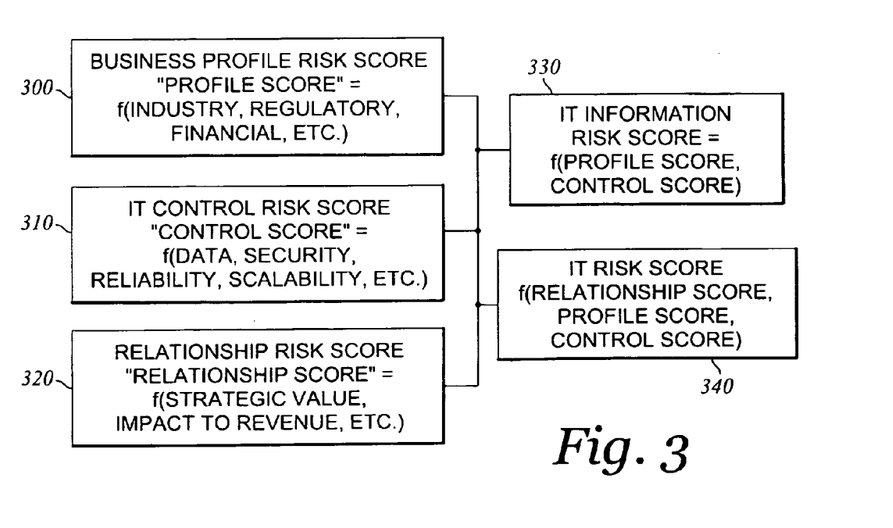
FIG. 3 is a block diagram of the scoring model implemented by the risk report component.

Referring briefly to FIG. 3, the business profile risk score 300 is a function of more than one variable. The IT control score 310 and the relationship risk score 320 are also functions of more than one variable associated with the plurality of IT information risk factors. The IT risk score 330 may be quantified as a function of the business profile score 300 and the IT control score 310. In another embodiment of the present invention, the IT risk score 340 is a function of the business profile risk score 300, the IT control risk score 310, and the relationship risk score 320.

An algorithm may also be utilized to separate the IT risk score 255 into a normalized baseline score and a composite score that adjusts the baseline score up or down depending upon the relationship the third party has with the client. The algorithm is f(sum(weighted and normalized score sub n where n=number of risk factors measured)*category weighting factor). The results are then normalized by category using standard mathematical normalization processes. The baseline score is stored in the database 120 and is available to other relying clients upon request from the third party associated with the client. Subsequent requests for the baseline score may be adjusted up or down depending upon the relationship the third party has with the requesting client.

The composite score is utilized to adjust the baseline score up or down depending upon the relationship risk assessment 125 and/or the third party business profile risk assessment 160. The algorithm uses weighted controls to determine specific impact to the client's business due to a control failure. The scoring model also provides a method for the client to assess IT information risk reduction based on reducing the normalized baseline score. The invention provides the ability to view the major contributors to IT and information risk in a number of meaningful views. As discussed above, the relationship risk score 130 may depend upon the client response to the subset of relationship risk factors. The business profile risk score 170 depends upon public record information about the third party associated with the subset of business profile risk factors. Therefore, it is contemplated that a change to either the client response or the public record information may correspond to a change in the composite score which results in adjusting the baseline score. It may then be assessed what impact a certain action has in reducing or increasing the baseline score. For example, the client may change their response from $1 million to $5 million to a question asking for the relative monetary value of the business relationship. In other words, the risk report component 24 is used to asses the increase in the IT information risk associated with the particular risk factor. The change in response corresponds to a change in the baseline score. The risk report component 24 may calculate the risk reduction or increase in risk exposure based upon at least one risk factor from the plurality of IT information risk factors stored on the database 120.

The risk monitoring component 28 is contemplated to provide real-time monitoring of the plurality of IT information risk factors associated with the various risk scores generated by the risk report component 24. The risk monitoring component 28 is capable of monitoring of the IT risk information associated with the relationship risk score 130, the business profile risk score 170, and the IT control risk score 210. The risk monitoring component 28 may be configured to continuously monitor and update the plurality of IT information risk factors such as the subset of relationship risk factors associated with the relationship risk assessment 125. For example, the risk monitoring component 28 may assess any changes to the type of relationship between the client and the third party, the length of the relationship, the contract terms, or the monetary value. The risk monitoring component 28 may transmit information updated in real-time associated with the plurality of IT information risk factors used by the risk report component 24 to generate the relationship risk score 130. Thus, it is contemplated that the risk report component 24 may generate an updated relationship risk score 130 based on IT risk information identified by the risk monitoring component 28.

The risk monitoring component 28 may also be configured to continuously monitor and update the IT risk information associated with the subset of business profile risk factors corresponding to the business profile risk assessment 160. In this respect, the risk monitoring component 28 may continuously search for IT risk information corresponding to the third party. For example, if a news story is published about an IT security breach corresponding to the third party, the risk monitoring component 28 collects data about such occurrences. This information is then updated within the database 120 and used by the risk report component 24. The updated IT risk information relates to the subset of business profile risk factors that are associated with the business profile risk assessment 170 of the third party. If an event or IT risk information associated with the third party is made available through public records, the risk monitoring component 28 may record the information and transmit the information to the risk reports component 24 for generating a revised business profile risk score 170.

The risk monitoring component 28 may be configured to continuously monitor and update the plurality of IT information risk factors including the subset of IT security control risk factors associated with the IT security control risk assessment 200. The integrated platform 12 is configured to assess IT risk information associated with a plurality of business relationships between the plurality of clients and the plurality of third parties. For example, the IT security control risk assessment 200 may be completed for the third party with respect to a first client. Another IT security control risk assessment 200 may then be conducted for the same third party with respect to a second subsequent client. If the IT control risk assessment 200 for the third party is different then the prior IT security control risk assessment 200 for the third party with respect to the first client, then the IT security control risk assessment 200 may be updated for the first client with the IT security control risk assessment 200 established for the second subsequent client. Therefore, IT risk information pertaining to one client may be updated in real-time from IT risk information pertaining to a different client. It is also contemplated that the plurality of IT information risk factors associated with a different client or different third party may be used to update the plurality of IT information risk factors associated with a particular client. Therefore, the risk monitoring component 28 may continuously monitor and update the plurality of IT information risk factors associated with the IT security control assessment 200 through updates to the IT risk information related to other business relationships. The risk monitor component 28 is configured to transmit the updated IT risk information associated with the plurality of risk factors for IT security control risk assessment 200 to the risk report component 24 for generating an updated IT security control risk score 210.

An aspect of the present invention contemplates the risk manager 20 component is a comprehensive solution for managing third party and client relationships. The risk manager 20 has the ability to easily catalog and manage third party relationships. The risk manager 20 is configured to automate risk reporting and streamlined risk decision making, exposure reporting based on regulation, information type, third party, country, etc. In one embodiment of the present invention, the risk manager component 20 provides a graphic user interface for the client to monitor and manage the plurality of business relationships between the client and third parties associated with the client. The risk manager 20 component is in communication with the database 120 and the risk report component 24 for receiving information stored within the database 120 and the generated IT risk score 255. It is also contemplated that the risk manager 20 component is in communication with other components associated with the integrated platform 12. The risk manager 20 component may display or list the third party relationships associated with the client. The display may provide such information as to whether the third party is certified by the client, specifies the contract, the expiration of the contract or relationship, the type of service (software development, application hosting, web hosting, data processing, consulting, etc.), the risk level associated with the third party, and any alerts.

The risk manager 20 component of the present invention may be accessed by the client via a secure login. Additionally, the risk manager 20 is an interactive tool for the client to monitor and manage the plurality of business relationships with the client's third parties. The client may select the third party from the list or display of third parties to obtain more detailed information associated with the selected third party. The information may include the relationship risk score 130, the business profile risk score 170, the IT control risk score 210, the IT risk score 255, remediation plans, and control evidence. The control evidence may include documents sufficient to validate certain IT risk information associated with the plurality of IT information risk factors. The risk manager component 20 provides the capability of analyzing the risk relationship score 130 by divided the relationship risk score 130 into three different scores that are key indicators and factors associated with the relationship risk assessment 125. The three scores may include data exposure, compliance and reporting exposure, and business process exposure.

Similar to the relationship risk score 130, the business profile risk assessment 160 may be selected as well via the risk manager component 20. The business profile risk assessment 160 may also include status information and various action plans. Additionally, the business profile risk score 160 may be divided into three scores to provide more insight into the business profile risk assessment 160. For example, the key indicators may include regulatory oversight, financial strength, and geopolitics. Thus, scores may be assigned to each of these key indicators. The risk manager component 20 may further dissect the IT control risk score 210 to obtain an IT control risk report. The IT control risk score 210 may be divided into three separate scores to more adequately explain the IT control risk score 210. In one example, the key indicators may include ISO27001/2, PCI 1.2, and FISAP (Financial Institution Shared Assessments Program).

It is also contemplated that the client or prospective client accesses the integrated platform 12 and may select a third party IT information risk score lookup option. The client inputs search criteria for the third party. The database 120 is searched for the IT risk score 255 of the 3rd Party. If the IT risk score 255 is available for the third party and the client has been granted access to the third party's risk score the "risk score report" is presented. If the risk scores are available but authorization has not been granted to the client then notification is given that access is denied and a "request for access" form must be submitted. The client completes the "request for access" form and submits. The "request for access" form may be sent via email to the subscribing client or third party for whom a request for the risk scores has been made. The subscribing client receives the "request for access" email, logs onto the integrated platform 12 and either approves or disapproves the request. If access is approved the requesting client is sent an email with a link to the site, logs in and views the risk score report. If access is denied, a denial email is sent to the requesting client.

The database 120 also provides a real-time searchable repository of standardized IT risk scores 255 by company, industry, service type, location and other attributes. The invention quantifies both the business profile risk assessment 160 of the third party and quantifies the risk of the third party IT security control assessment 200 by industry sector. These scores are then provided as searchable data points for clients looking to do business with the third party. This provides tremendous proactive and timely risk insight on potential third parties prior to clients engaging them. The invention provides the method to query the database for third party risk details including IT risk scores 255 for the third party similar to a Dun & Bradstreet search. As third party security reviews are completed and documented, the IT risk scores 255 are added to the database 120. Existing clients may be alerted as new third parties are added or may just look up third parties to perform research. Prospective clients are allowed to search the database 120 to see if the IT risk score 255 is on file for the third party the prospective client would like to review before subscribing to the service.

The IT risk score 255 allows clients to be able to do fast, easy direct searches/lookups into a third party risk score repository to get the information needed before engaging with the third party from an IT risk perspective to make the best business decision for their organization. The IT risk score 255 is contemplated to be utilized by businesses to determine whether or not the IT information risk posed by its third parties are within the client's risk tolerance comfort level. It may be comparable to a consumer's credit score that is used by banks to decide to either fund a loan or not fund a loan. It is contemplated that the risk score lookup service extrapolates tolerable information risk levels for various industry sectors by combining a multitude of individual IT information risk scores established for its clients and the third parties that support them using mathematical formulas and algorithms. This process is analogous to the way credit score ranges are created as a byproduct of creating thousands of individual consumer credit scores. By using the weighted average of scores by industry, a range of scores for the industry is extrapolated.

Figure 5:
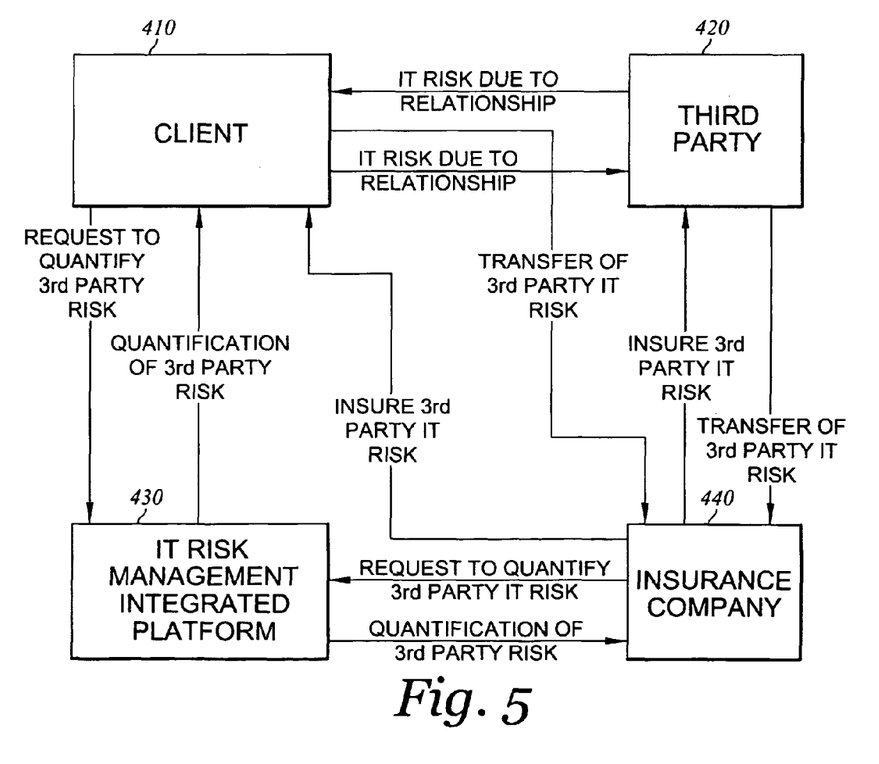
FIG. 5 is a diagram illustrating transfer of IT information risk utilizing insurance services constructed in accordance with the present invention.

The insurance application 18 is configured to assess the IT risk score 255 including the relationship risk score 130, the business profile risk score 170, and the IT control risk score 210 to determine an appropriate insurance coverage policy for the client. Referring now to FIG. 5, the client 410 requests the integrated platform 430 to quantify IT information risk related to the business relationship with the third party as represented by the arrow shown. Following the quantification of the IT information risk quantified by the integrated platform 430 with respect to the business relationship between the client 410 and the third party 420, the IT information risk may be transferred to an insurance company 440. Additionally, the third party 420 may also have the option of transferring risk associated with the third party's business relationship with the client 410. The insurance application 18 is configured to provide the option of transferring the IT information risk to a third party insurer willing to indemnify the client from damages resulting from the identified risk exposure.

Insurance companies may reply based upon the IT risk score 255 as one data point that feeds into their decision whether or not to assume the identified risk and insure the client against damages resulting from it. The insurance application 18 acts as an online brokerage house for multiple insurers for the clients to get a competitive insurance bid. The insurer 440 may choose to underwrite policies to insure both the client 410 and the third party 420 or just one or the other based on the underwriting criteria. The client 410 is allowed to choose the insurance coverage that best meets their needs. The IT risk scores are used to determine the level of risk for underwriting. The insurance application 18 provides a plurality of cyber insurance options for the client 410 to mitigate or transfer the risk established by the IT risk scores. The cyber insurance options may include network security and privacy liability, digital content and intellectual property infringement liability, property and business income loss, cyber extortion, regulatory defense and crisis management. The insurance coverage options are tailored by the insurance application 18 based on the IT information risk exposure. It is also contemplated that the client 410 may conduct risk reduction assessments to determine the impact the IT risk score may have on obtaining insurance coverage through the insurance application 18. For example, the client may vary responses to the subset of relationship risk factors to determine the corresponding change in the IT risk score 255. Based upon these changes, the client may determine certain actions that reduced the cost of insurance.

The compliance manager 22 is contemplated as a graphical user interface the client may view, track, and monitor contractual obligations associated with third party business relationship. Additionally, the compliance manager 22 may monitor regulatory and industry standards. An aspect of the present invention contemplates a single platform utilized to manage compliance to key industry regulatory standards. The invention creates the ability to create a risk based analysis of the compliance to multiple regulations, industry and technical standards using a flexible controls definition. The invention's method performs a common criteria mapping across the multiple regulations and standards (e.g. ISO27001/2, PCI, FISAP, GLBA, HIPPA, FERC) allowing the client to manage compliance of these regulatory standards through the single platform. The present invention adds to the process by using risk based analysis to determine the amount of risk associated with non-compliance.

Figure 6:
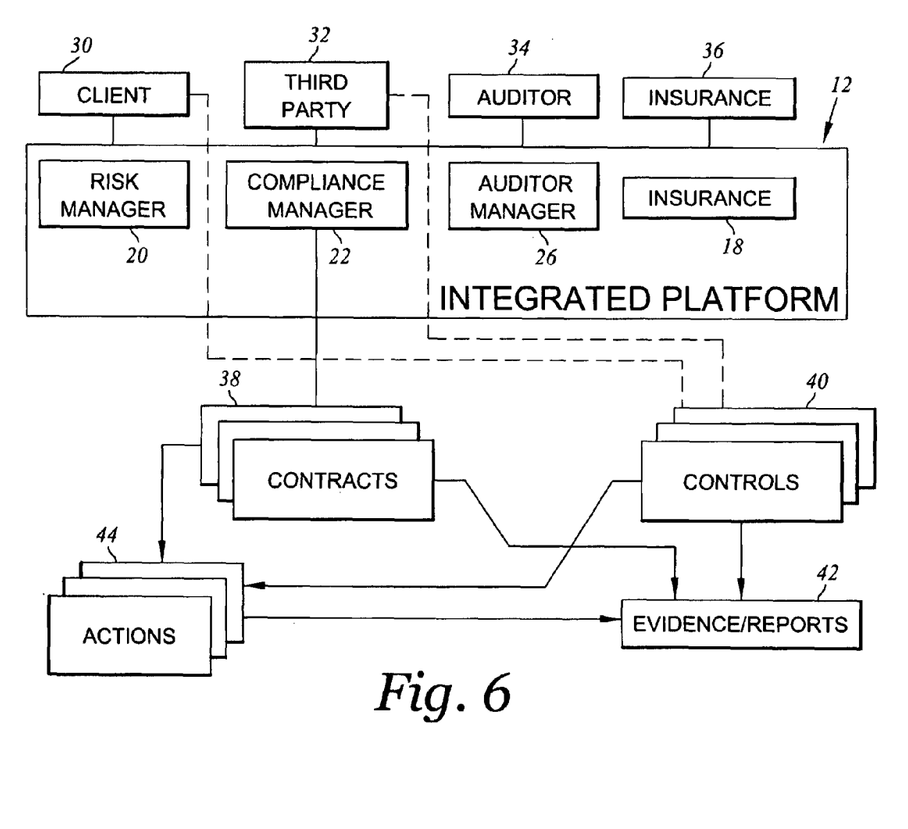
FIG. 6 is a block diagram incorporating aspects of a compliance manager.

Referring now to FIG. 6, the compliance manager 22 according to an embodiment of the present invention is provided with respect to the integrated platform 12. The compliance manager 22 may keep track of a plurality of contracts 38. Each contract from the plurality of contracts 38 may include control evidence or reports 42 securely stored on the database. The compliance manager 22 is configured to define a plurality of obligations or actions 44 based upon each contract 38. The client 30 and the third party 32 may provide information or responsive answers in the form of controls 40. The compliance manager 22 may then assess the controls 40 provided by the client 30 and the third party 32 with respect to the actions 44. It is contemplated that the various stakeholders including the client 30, the third party 32, the auditor, or an insurer 36 have access to the compliance manager 22 to information associated with a particular contract only as it pertains to the stakeholders role with respect to the contract 38.

The present invention also contemplates due diligence and monitoring services that allow for a regulatory compliant, scalable and cost effective third party risk management program. The audit manager component 26 contemplates a method for standardizing the IT auditing process into a quantifiable measure of risk. The invention provides an auditor the ability to review the controls and evidence as represented by the third party. The auditor may track each of their audit assignments. Thus, the invention contemplates the ability to reduce costs by using lower cost resources through online access to evidence replacing the high-cost local auditors. Furthermore, the audit manager component 26 contemplates the capability of storing and securing evidence of controls compliance. The integrated platform provides the ability to perform due diligence reviews through an online portal utilized by the auditor. The integrated platform 12 is capable of providing an on-site auditor the ability to review physical evidence and indicate audit results to be stored on the database.

The integrated platform 12 provides a method of funneling the plurality of third parties based upon their business profile risk scores 170. The funneling or risk profiling method is a quick and cost saving method for the client to assess business relationships with a multitude of third parties to determine which third parties are within the client's risk tolerance level and which third parties require further risk assessment. The present invention provides a standardized method for comparing the relative business risk across a population of third party relationships. Automation is accomplished by using a web based technology to gather information about the third party which allows the client an easy and simple way to register and catalog all third party relationships and be able to quickly identify and quantify high, medium, and low IT information risk relationships. The funneling process reduces the level of effort in identifying and managing the number of third parties that must be reviewed in depth due to their business profile risk assessment 160. It is contemplated that the subset of business profile risk factors from the plurality of IT information risk factors are evaluated with respect to each third party. The subset of business profile risk factors are assigned corresponding weighting factors to generate the business profile risk score 170 and then used to eliminate third parties that are not within the client IT information risk tolerance level. Eliminated third parties are documented and included in audit reports to provide evidence of the client's due diligence.

Following review of the risk profiling reports to the client, work flow actions are offered: request IT risk score 255 and validation for medium or high risk profile scores. It is also contemplated that the IT risk score 255 may be provided at each stage or level of assessment rather than a total score. The invention provides a method in which wherever the client is in the risk management process, the client is presented with the IT risk score at each stage. This differs from the "all or nothing" risk scoring function available in most reviews. Based on the results of the funneling process, more in depth reviews can be scheduled. The third parties that pose minimal or acceptable levels of IT information risk are noted and the documentation can be used to support audits. The funneling process results in a list of third parties that have completed as many as four levels of analysis until the third parties that pose the greatest IT information risk to the client are identified. The funneling method also provides for dynamic policy management and enforcement. An automated risk management component provides an exception process against policy non-compliance for short-term risk acceptance until the exception expires in which the risk has to be mitigated or transferred. The invention contemplates a pre-defined policy template based on IT risk score 255.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention.

What is claimed:

1. A risk assessment system, the system comprising:
a database configured to store a set of information technology (IT) information risk factors, a set of business profile risk factors, a set of IT control risk factors, client entity information comprising at least one client entity, and third party entity information comprising at least one third party entity, where a third party entity in the third party entity information comprises publicly available data associated with the third party entity and an IT security control assessment associated with the third party entity, where the IT security control assessment measures IT information risk associated with network infrastructure of the third party entity;
memory configured to store a scoring application; and
a processor;
wherein an IT information risk factor in the set of IT information risk factors comprises relationship risk information, where the relationship risk information comprises relationship risk factors and a business relationship between a client entity in the client entity information and a third party entity in the third party entity information;
wherein a business profile risk factor in the set of business profile risk factors describes the risk to a client entity in the set of client entity information doing business with a third party entity in the set of third party entity information;
wherein an IT control risk factor in the set of IT control risk factors describes the maturity of IT security controls for a third party entity in the third party entity information;
wherein the database is configured to receive additional IT information risk factors and store the additional IT information risk factors in the set of IT information risk factors;
wherein the risk assessment system is accessible to a plurality of client machines, where at least one of the client machines in the plurality of client machines is associated with a client entity in the client entity information stored in the database;
wherein the risk assessment system is accessible to a plurality of third parties machines separate from the plurality of client machines, where at least one of the third party machines in the plurality of third party machines is associated with a third party entity in the third party entity information stored in the database; and
wherein the scoring application configures the processor to:
select a target client entity in the client entity information;
select a target third party entity in the third party entity information;
generate a relationship risk score for the target client entity and the target third party entity based on the relationship risk factors and the relationship between the target client entity and the target third party entity;
generate a business profile risk score based on the relationship between the target client entity and the target third party entity and a subset of the set of the business profile risk factors;
generate an IT control risk score based on the subset of the set of the IT control risk factors associated with the target third party entity;
generate an IT information risk score based on the business profile risk score and the IT control risk score;
generate an IT risk score based on the IT control risk score and the relationship risk score;
generate a risk score based on the IT information risk score and the IT risk score, where the risk score describes the risk associated with the target client entity sharing data with the target third party entity; and
store risk score using the database.

2. The system of claim 1, further comprising:
a risk manager application;
wherein the risk manager application configures the processor to:
receive a plurality of IT information risk factors in the set of IT information risk factors; and simulate an adjustment to at least one risk score in the plurality of risk scores using at least one IT information risk factor in the set of IT information risk factors.

3. The system of claim 2, wherein the risk assessment system is implemented using a plurality of servers.

4. The system of claim 2, wherein:
the database is configured to store IT risk information, where IT risk information comprises information related to the relationship risk factors between a client entity in the client entity information and a third party entity in the third party entity information;
the database is configured to receive IT risk information from a client machine; and
the IT risk information corresponds to at least one IT information risk factor in the set of IT information risk factors.

5. The system of claim 4, further comprising:
a database update application stored in the memory;
wherein the database update application configures the processor to:
locate IT risk information stored on one or more external servers; and
store the located IT risk information using the database.

* * * * *